United States Patent [19]

Zimmermann

[11] Patent Number: 4,925,108
[45] Date of Patent: May 15, 1990

[54] SPRAY HEAD FOR THE ADMINISTRATION OF A MULTI-COMPONENT MATERIAL BY MEANS OF GAS

[75] Inventor: Josef Zimmermann, Sulzbach, Fed. Rep. of Germany

[73] Assignee: Hoechst Aktiengesellschaft, Frankfurt am Main, Fed. Rep. of Germany

[21] Appl. No.: 226,327

[22] Filed: Jul. 29, 1988

[30] Foreign Application Priority Data

Aug. 1, 1987 [DE] Fed. Rep. of Germany ....... 3725553

[51] Int. Cl.$^5$ .............................................. B05B 7/04
[52] U.S. Cl. ................................ 239/419.3; 239/427.5
[58] Field of Search ................. 239/419.3, 422, 427.5, 239/432

[56] References Cited

U.S. PATENT DOCUMENTS

| | | | |
|---|---|---|---|
| 725,176 | 4/1903 | Thurman | 239/422 |
| 1,071,381 | 8/1913 | Anthony | 239/432 |
| 1,085,313 | 1/1914 | Wickel | 239/432 |
| 1,387,078 | 8/1921 | Simon | 239/422 |
| 1,907,604 | 5/1933 | Stephenson | 239/419.3 |
| 3,455,510 | 7/1969 | Rotolico | 239/419.3 |
| 4,453,670 | 6/1984 | Sirovy | 239/432 |

FOREIGN PATENT DOCUMENTS 0037393 1/1983 European Pat. Off. .

Primary Examiner—Andres Kashnikow
Assistant Examiner—Michael J. Forman
Attorney, Agent, or Firm—Finnegan, Henderson, Farabow, Garrett and Dunner

[57] ABSTRACT

In the spray head for the administration of a multicomponent material by means of gas, the delivery channels (7, 7a) for the individual components and the gas channel (8) are arranged separately from one another. The gas channel, provided with a gas supply (3), is divided by a separating web (9) into a plurality of channels (8a, 8b) running parallel to the separating web. Into the channels (8a, 8b) there open out delivery channels (7, 7a). The separating web protrudes beyond the channel ends (6, 6a).

10 Claims, 2 Drawing Sheets

SPRAY HEAD FOR THE ADMINISTRATION OF A MULTI-COMPONENT MATERIAL BY MEANS OF GAS

BACKGROUND OF THE INVENTION

FIELD OF THE INVENTION

The invention relates to a spray head for the administration of a multi-component material by means of gas, in which the delivery channels for the individual components and the gas channel are arranged separately from one another.

DESCRIPTION OF THE RELATED ART

An apparatus of the type mentioned at the beginning is known from European Patent Specificiation 0,037,393. The syringe elements for the components are connected via cones to the delivery channels of a spray head. The spray head has a feed channel for gas, which divides inside the spray head into two branches, the outlet openings of which are arranged in the region of the mouths of the delivery channels and are disposed at an angle to each other and are directed at right angles to the outlet direction of the components. The components, which are fed via the syringe elements (reciprocating pumps), are sprayed by the gas introduced through the feed channels. The spray cones join, depending on the size of the angle which the spray axes form, at a greater or lesser distance away from the mouths of the delivery channels, where they mix and the components react with each other. It is disadvantageous that accurate spraying is not possible with this spray head, as the object to be sprayed must lie precisely at the intersection of the spray jets if a satisfactory result is to be achieved.

The invention is to provide a remedy here.

SUMMARY OF THE INVENTION

According to the invention, as it is defined in the claims, the object is achieved by a spray head in which the gas channel is divided by a separating web into a plurality of channels running parallel to the separating web, into which channels the delivery channels open out, the separating web protrudes beyond the channel ends and the gas channel is provided with a gas supply. The delivery channels may open out at an angle $\alpha \leq 90°$ into the channels running parallel to the separating web.

The advantages achieved with the invention are to be seen in particular in that the coalescence of the components directly behind the end of the separating web produces a slender spray cone, which makes possible a uniform mixing of the components and an accurate spraying of the object even from close to and at low spraying pressure. The separating web also has the effect of avoiding premature contact of the different components with one another, which would lead to blockages of the channels.

The spray head is suitable in particular for the administration of surgical histoadhesive, which is formed from the components in situ after passing the separating web end.

BRIEF DESCRIPTION OF THE DRAWINGS

The invention is explained in more detail below by drawings showing merely one embodiment and in which.

Figure 1:
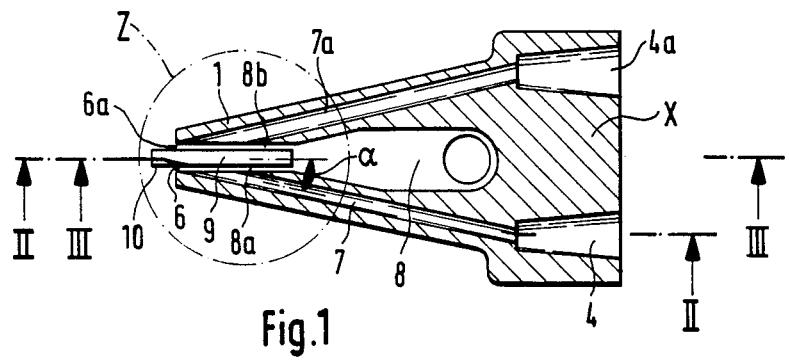
FIG. 1 shows the spray head in sectional plan view.
Figure 2:
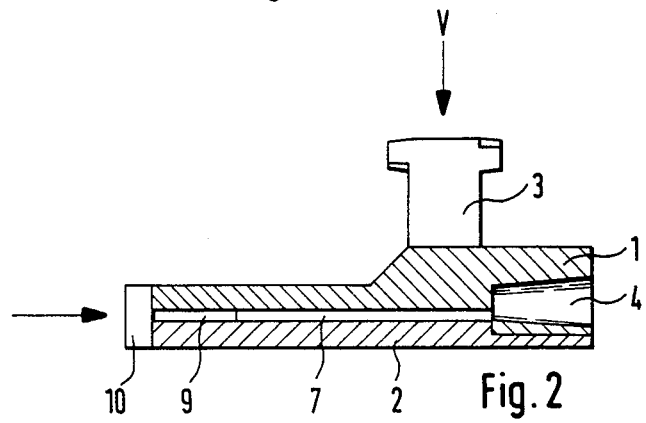
FIG. 2 shows the section II—II of FIG. 1.
Figure 3:
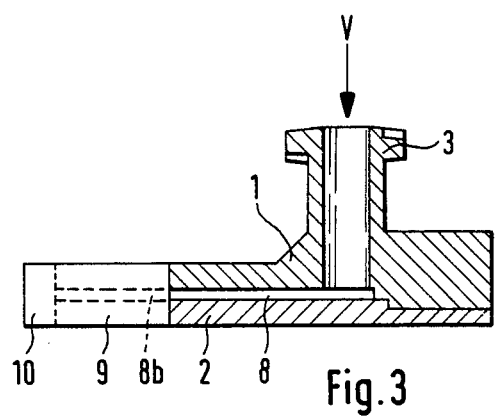
FIG. 3 shows the section III—III of FIG. 1.
Figure 4:
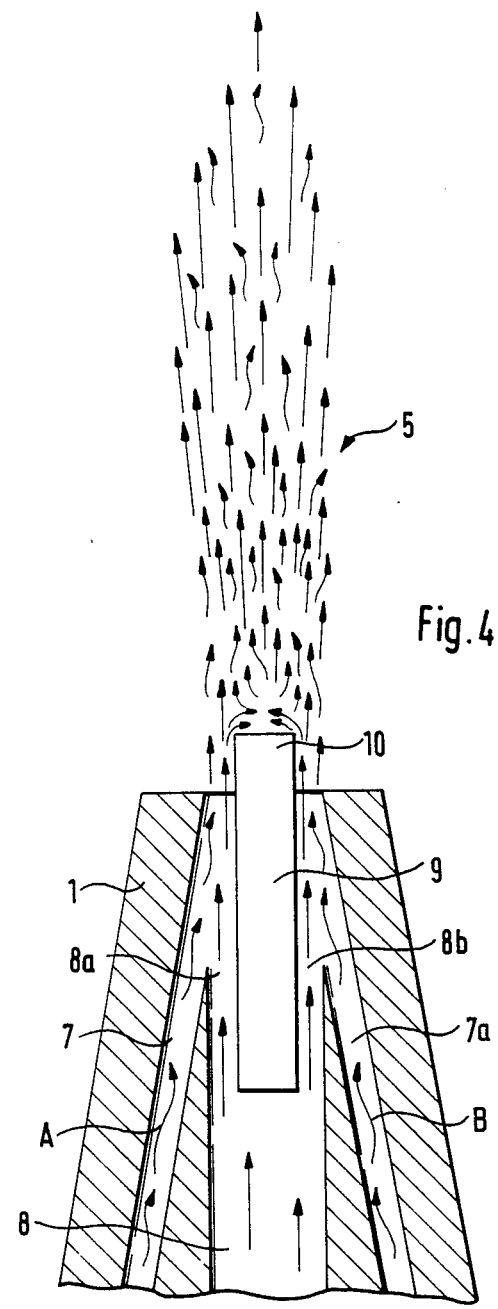
FIG. 4 shows the cutaway "Z" of FIG. 1 with spray pattern in plan view.

They delivery channels 7 and 7a for the components of the multi-component material and the gas channel 8 are arranged in the housing 1 of the spray head. The gas channel is divided by the separating web 9 into channels 8a, 8b running parallel to the separating web, into which channels the delivery channels 7, 7a open out at an angle $\alpha \leq 90°$. The separating web 9 protrudes beyond the channel ends 6, 6a. The gas channel 8 is provided with a gas supply 3. The delivery channels 7, 7a may be provided with inner cones 4, 4a for receiving disposable syringes (not shown), which contain the components, for example fibrinogen solution and thrombin solution. If the multi-component material consists of three or more components, the separating web 9 may be designed triangularly or polygonally in cross-section, so that the gas channel is divided according to the number of corners or components. The end 10 of the separating web 9 protruding from the spray head may be made angular or rounded-off. The components A and B are fed via the delivery channels 7 and 7a to the gas channels 8a, 8b, entrained by the gas (air) and swirled behind the end 10 of the separating web 9, so that they can react. 5 symbolizes the spray pattern and 2 the housing cover. Production engineering reasons may also necessitate a different arrangement of the delivery channels and of the gas channel in the housing 1.

I claim:

1. A spray head for dispensing a multi-component material, the spray head comprising:
   a spray head body;
   individual delivery channel means each including a distal end portion, each said delivery channel means for separately conveying a component of said multi-component material in a direction towards said distal end portions;
   separating means disposed between said distal end portions of said delivery channel means for preventing the components of said multi-component material from mixing within said body;
   gas channel means within said spray head body for providing gas pressure to each of the components of said multi-component material entrain each of said components upstream of a downstream end of said separating means and to evacuate said components from said spray head body.

2. A spray head as set forth in claim 3, wherein said individual delivery channel means includes at least two delivery ducts, having distal ends, said gas channel means including a gas port and a gas duct, said gas duct converging with said delivery ducts thereby defining an area of convergance proximate said distal ends of said delivery ducts.

3. A spray head as set forth in claim 2, wherein said separating means includes a separating web disposed in said area of convergence, said separating web and each said delivery duct cooperating to define a gas channel to separately evacuate each said delivery duct.

4. A spray head as set forth in claim 3, wherein said separating web has a triangular cross-section.

5. A spray head as set forth in claim 3, wherein said separating web has a polygonal cross-section.

6. A spray head as set forth in claim 2, wherein the angle between said gas duct and each said delivery duct in the area of convergance is not more than 90°.

7. A spray head as set forth in claim 2, wherein said at least two delivery ducts are two delivery ducts.

8. A spray head as set forth in claim 2, wherein said at least two delivery ducts are three delivery ducts.

9. A spray head as set forth in claim 1, wherein said individual delivery channel means include means for receiving syringes, said receiving means disposed opposite said distal end portions.

10. A spray head as set forth in claim 1, wherein said separating means protrudes from said spray head proximate said distal end portions of said delivery channel means.

* * * * *